(12) United States Patent
Hino et al.

(10) Patent No.: US 10,455,648 B2
(45) Date of Patent: Oct. 22, 2019

(54) METHOD AND APPARATUS FOR HEATING STEEL SHEET

(75) Inventors: Yoshimichi Hino, Fukuyama (JP); Hirokazu Sugihara, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 1468 days.

(21) Appl. No.: 14/127,735

(22) PCT Filed: Jul. 25, 2012

(86) PCT No.: PCT/JP2012/068780
§ 371 (c)(1),
(2), (4) Date: Dec. 19, 2013

(87) PCT Pub. No.: WO2013/015297
PCT Pub. Date: Jan. 31, 2013

(65) Prior Publication Data
US 2014/0124503 A1    May 8, 2014

(30) Foreign Application Priority Data

Jul. 28, 2011   (JP) .................................. 2011-165238
Mar. 29, 2012   (JP) .................................. 2012-075918

(51) Int. Cl.
*C21D 9/60* (2006.01)
*H05B 6/10* (2006.01)
(Continued)

(52) U.S. Cl.
CPC ............... *H05B 6/101* (2013.01); *C21D 1/42* (2013.01); *C21D 1/60* (2013.01); *C21D 8/12* (2013.01);
(Continued)

(58) Field of Classification Search
CPC ........... C21D 9/60; H05B 6/365; H05B 6/104
(Continued)

(56) References Cited

U.S. PATENT DOCUMENTS 3,031,555 A    4/1962   Ross et al.
4,788,396 A *  11/1988  Maugein ................. B22F 3/105
                                                         219/635
(Continued)

FOREIGN PATENT DOCUMENTS

CN    101120616 A    2/2008
CN    101120617 A    2/2008
(Continued)

OTHER PUBLICATIONS

Apr. 2, 2015 Office Action issued in Russian Patent Application No. 2014102602.
(Continued)

*Primary Examiner* — Tu B Hoang
*Assistant Examiner* — Thomas J Ward
(74) *Attorney, Agent, or Firm* — Oliff PLC

(57) ABSTRACT

The invention proposes a method for heating a steel sheet wherein the generation of buckling can be prevented regardless of presence or absence of rolls restraining the steel sheet by antecedently heating the widthwise central portion of the steel sheet with a solenoid type induction heating coil having a convex form projected onto the surface of the steel sheet toward an upstream side in rapidly heating the continuously traveling steel sheet, whereby an isotherm of the steel sheet in the heating is a convex form toward the upstream side, so that a large wrinkle is generated on the steel sheet, and also proposes a heating apparatus used in this method.

3 Claims, 6 Drawing Sheets

(51) Int. Cl.
*C21D 1/42* (2006.01)
*C21D 8/12* (2006.01)
*C21D 1/60* (2006.01)
*F27D 99/00* (2010.01)

(52) U.S. Cl.
CPC ........ *C21D 9/60* (2013.01); *F27D 2099/0015* (2013.01); *Y02P 10/253* (2015.11)

(58) Field of Classification Search
USPC ........................................ 219/645, 671, 672
See application file for complete search history.

(56) References Cited

U.S. PATENT DOCUMENTS

| | | | |
|---|---|---|---|
| 6,594,446 B2 * | 7/2003 | Camm | .................... C30B 31/12 118/50.1 |
| 2008/0264932 A1 | 10/2008 | Hirota | |
| 2010/0155390 A1 * | 6/2010 | Hirota | .................... H05B 6/362 219/645 |

FOREIGN PATENT DOCUMENTS

| | | |
|---|---|---|
| JP | A-58-113325 | 7/1983 |
| JP | A-4-41624 | 2/1992 |
| JP | A-5-156420 | 6/1993 |
| JP | A-7-41860 | 2/1995 |
| JP | A-8-277425 | 10/1996 |
| JP | 2002-317227 A | 10/2002 |
| JP | A-2003-73746 | 3/2003 |
| JP | A-2003-187951 | 7/2003 |
| JP | A-2005-226106 | 8/2005 |
| JP | 2007-095651 A | 4/2007 |
| JP | 2008-053010 A | 3/2008 |
| JP | 2011-098393 A | 5/2011 |
| RU | 2418075 C1 | 5/2011 |

OTHER PUBLICATIONS

May 15, 2015 Search Report issued in European Patent Application No. 12818226.8.
May 19, 2015 Office Action issued in Korean Patent Application No. 10-2013-7034098.
Jun. 3, 2015 Office Action issued in Chinese Patent Application No. 201280033376.1.
Aug. 31, 2016 Office Action issued in Japanese Patent Application No. 2015-218117.
Sep. 9, 2015 Office Action issued in Japanese Patent Application No. 2012-075918.
Sep. 2, 2014 Office Action issued in Chinese Patent Application No. 201280033376.1 (with partial translation).
Sep. 11, 2012 International Search Report issued in International Application No. PCT/JP2012/068780.
Nov. 26, 2015 Office Action issued in Korean Patent Application No. 10-2013-7034098.
Jan. 4, 2016 Office Action issued in Chinese Patent Application No. 201280033376.1.
Nov. 15, 2016 Office Action issued in European Application No. 12818226.8.

* cited by examiner

[FIG.1]
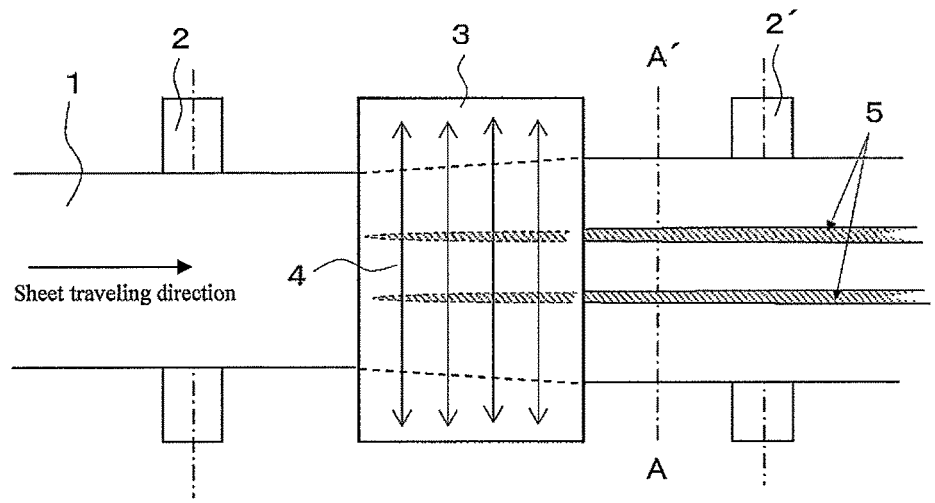
[FIG.2]
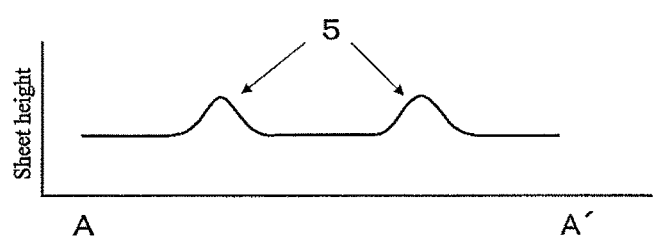
[FIG.3]
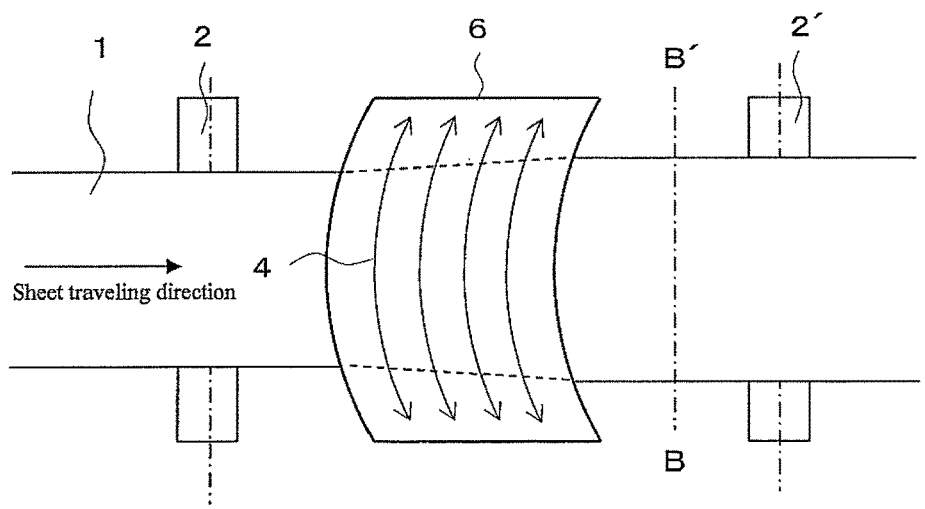
[FIG.4]
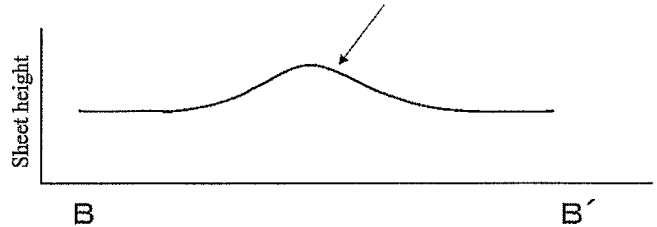

【FIG.5】
(a)
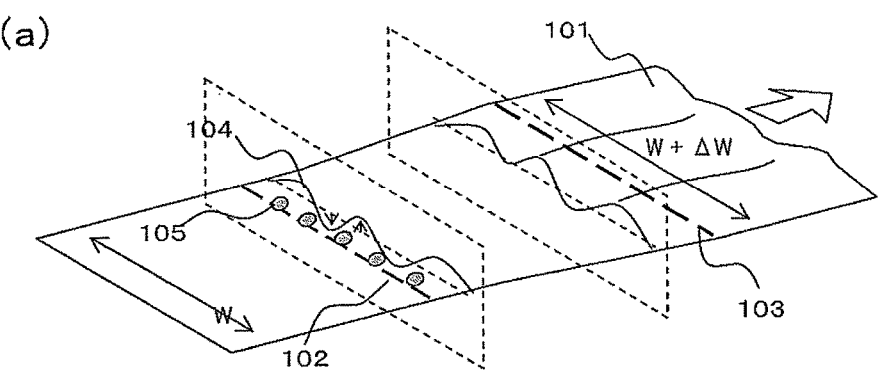
(b)
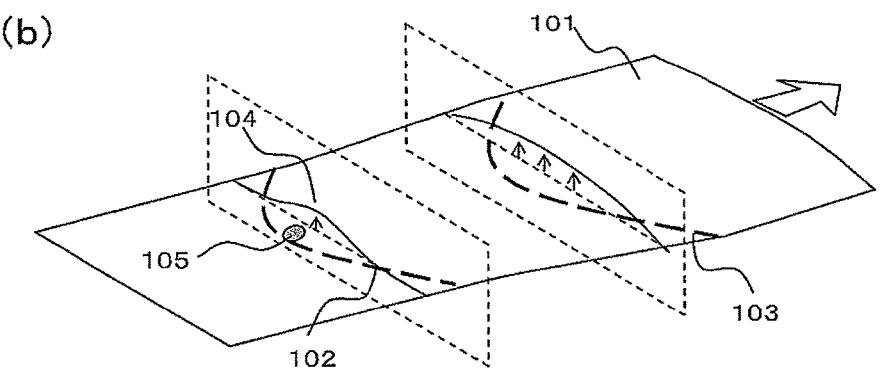
(c)
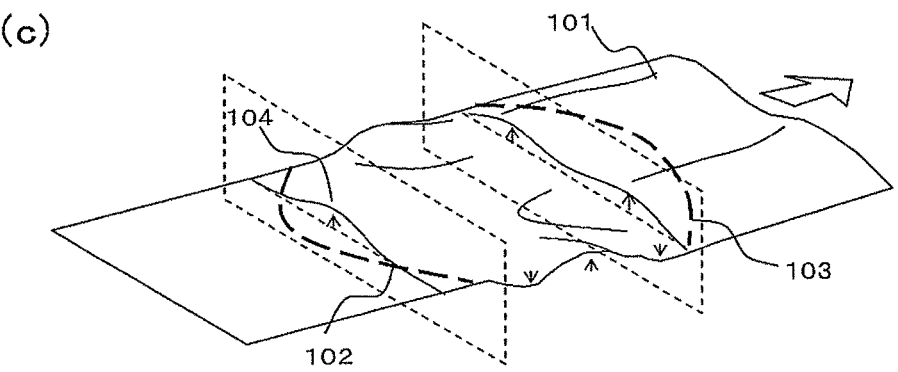

【FIG.6】
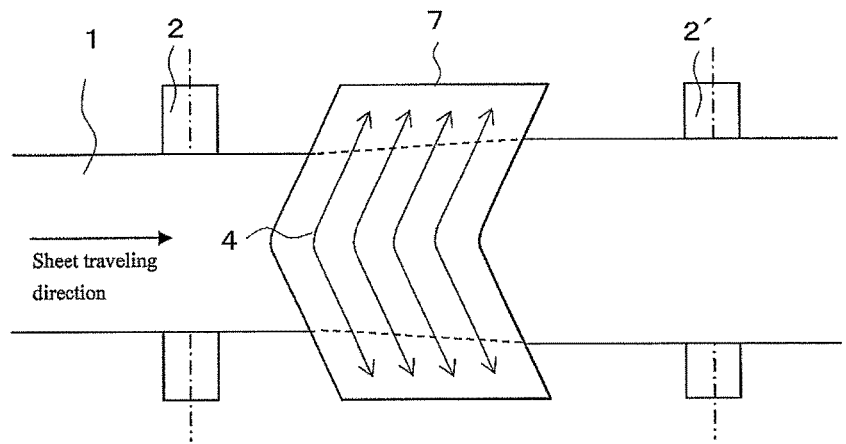
【FIG.7】
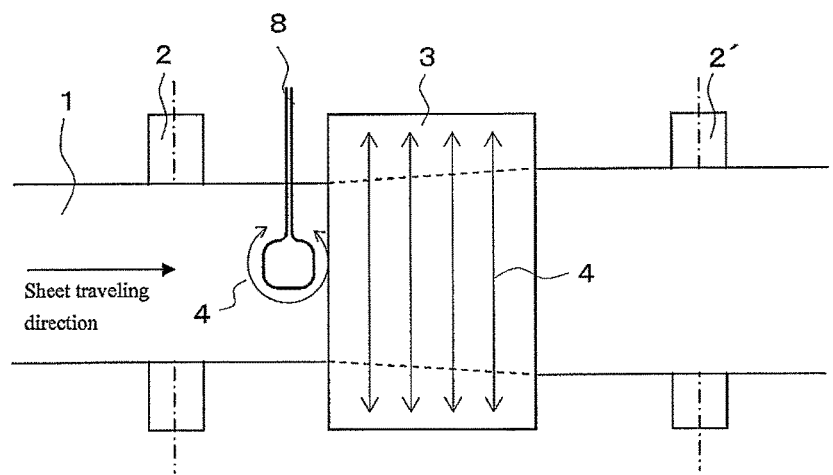
【FIG.8】
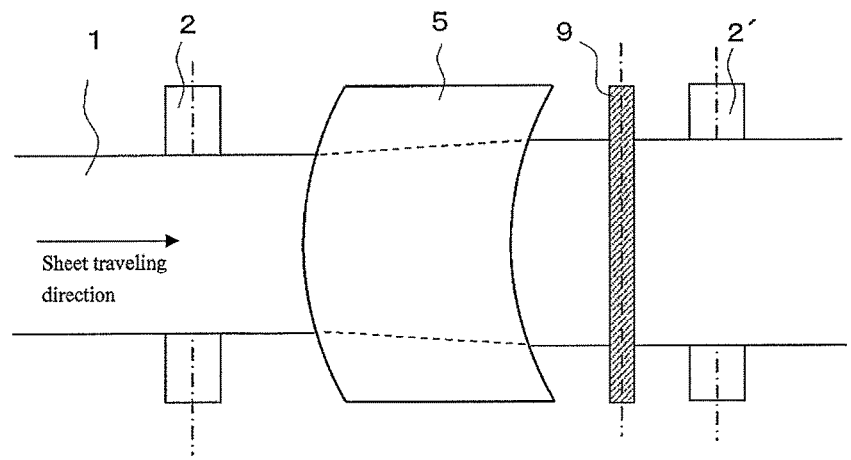

[FIG. 9]
(a)
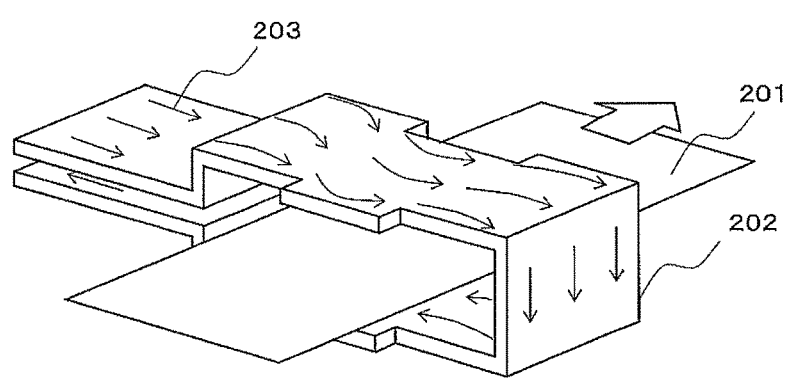
(b)
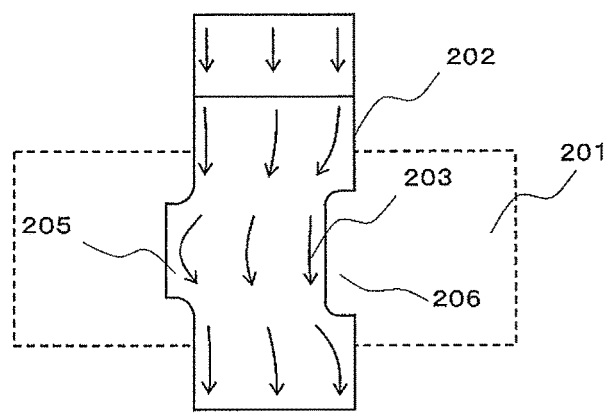
(c)
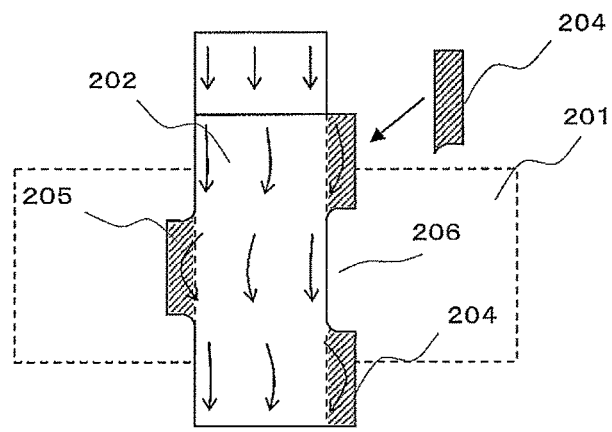

[FIG.10]
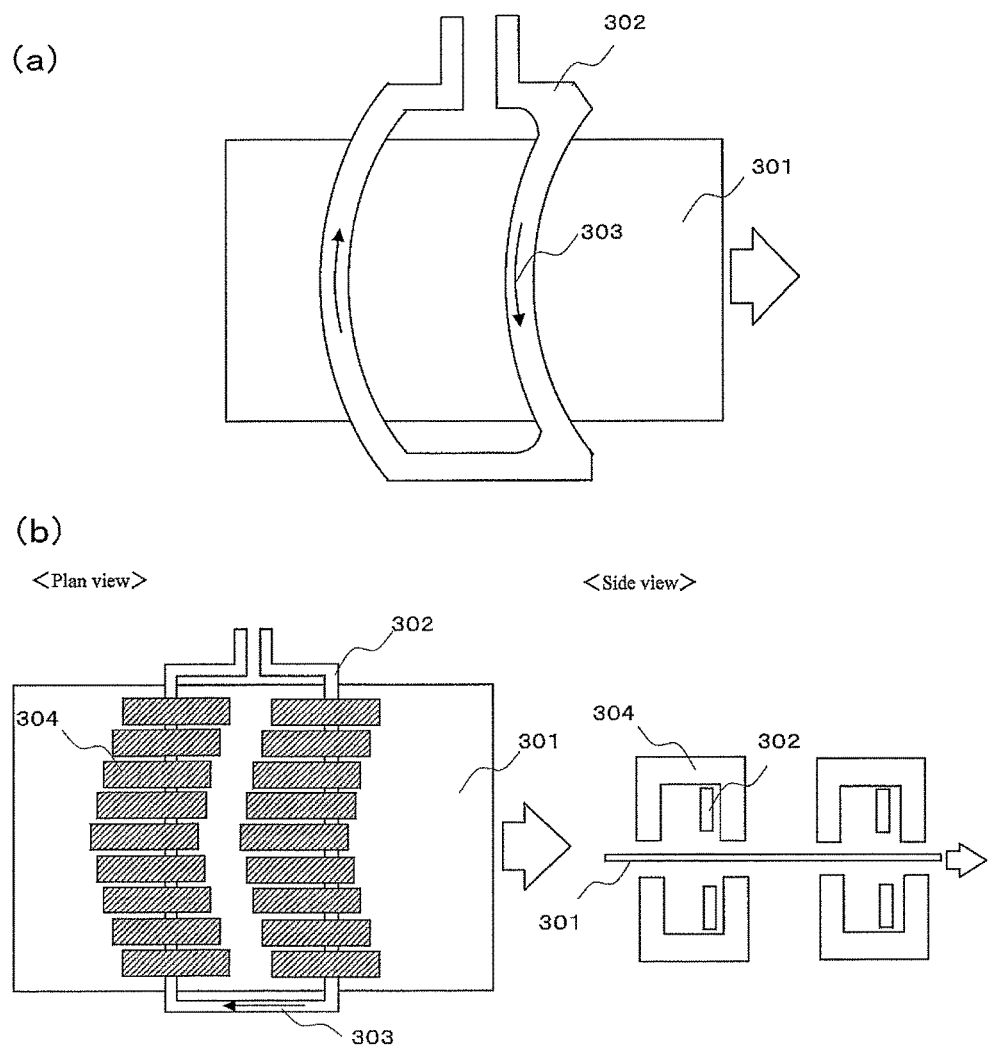

【FIG.11】
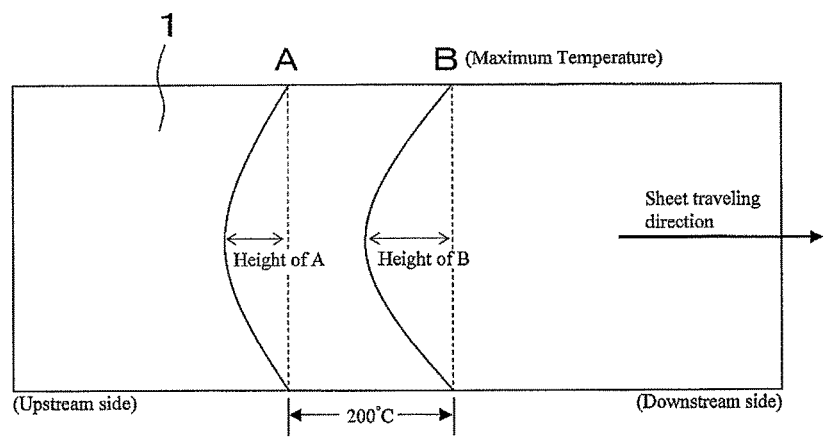

METHOD AND APPARATUS FOR HEATING STEEL SHEET

TECHNICAL FIELD

This invention relates to a method and an apparatus for heating a steel sheet, and more particularly to a method and an apparatus for heating a steel sheet, which is effective to prevent buckling or wrinkling defects, hereafter "buckling", easily caused during the rapid heating.

RELATED ART

In a continuous annealing installation or continuous galvanizing installation for steel sheets, heating from room temperature to a higher temperature is carried out by introducing a continuously passed steel sheet into a furnace kept at a higher temperature and indirectly heating through heat conduction from an atmosphere inside the furnace or radiant heat from a radiant tube or a furnace wall. In such an indirect heating method, however, it is difficult to obtain a large heating rate of not less than 10° C./sec when the sheet has a thickness of 1 mm. On the other hand, in view of the productivity and product properties, there is a case that a further rapid heating is demanded as compared with the above indirect heating method.

As a technique meeting the above demand is developed a method of direct Joule heating of electrical current into the sheet from electrodes or by disposing an induction coil to induce current into the steel sheet. For example, Patent Document 1 discloses a technique suitable for rapidly heating a steel sheet after the galvanization from a temperature of a galvanizing bath to a temperature for an alloying treatment by flowing a low frequency current between two points in a transferring direction of a metal band such as steel band or the like and induction-heating at a higher frequency partially between the two points. Also, Patent Document 2 discloses a technique wherein an oriented electrical steel sheet having a high magnetic flux density is obtained by conducting rapid heating at a rate of not less than 80° C./sec with electric-heating between rolls on the way of raising temperature process in decarburization annealing.

In such a rapid heating, however, there is a problem that the steel sheet after the rapid heating is apt to cause "buckling". For example, Patent Document 3 discloses that the steel sheet heated in the electrical heating apparatus causes a striped defect called as "buckling" after passing through conductor roll at a downstream side in a sheet passing direction and that in order to prevent the buckling, it is effective to enforce a buckling-preventive roll divided into two parts in a width direction onto the steel sheet from either upper or lower face thereof at a proper opening angle with respect to a traveling direction of the sheet just before the downstream conductor roll to smooth out wrinkles in the width direction of the sheet.

PRIOR ART DOCUMENTS

Patent Documents

Patent Document 1: JP-A-H05-156420
Patent Document 2: JP-A-H07-041860
Patent Document 3: JP-A-H08-277425

SUMMARY OF THE INVENTION

Task to be Solved by the Invention

In Patent Document 3, the cause of the above "buckling" is described as due to the fact that when the steel sheet is rapidly heated by electrical heating between the conductor rolls as electrodes disposed at upstream and downstream sides thereof, it tends to expand in the width direction of the sheet, but thermal expansion is constrained by the downstream conductor roll to generate wrinkles and further the wrinkle portion is subjected to plastic deformation by pressing down when the sheet passes through a pinched portion of the conductor rolls or the like to thereby form a striped flaw. According to this description, it is considered that the generation of the buckling can be prevented by an induction heating system using no conductor roll.

Without doubt, the generation of the buckling is largely reduced in the induction heating without the conductor roll. According to the inventors' inspection, however, it is confirmed that a plurality of small longitudinal wrinkles are generated even in the induction heating without rolls restricting free expansion of the steel sheet likewise the electrical heating to cause the buckling. There is a possibility that this buckling can be solved by applying the technique disclosed in Patent Document 3. However, when the buckling-preventive roll is disposed just after the induction heating coil, flaws may be generated by contacting the steel sheet with the buckling-preventive roll. Also, since the buckling-preventive roll acts to constrain the slippage of the steel sheet in its expanding direction, when the heating temperature is variously changed, there is a problem that the roll cannot deal with the change of thermal expansion associated therewith. Further, it is difficult to ensure a space required for disposing the roll. Even if the roll is disposed, there are many problems in the facility cost and maintenance because the buckling-preventive roll of Patent Document 3 is complicated in the facility.

The invention is made in view of the problems inherent to the conventional techniques and is to propose a method for heating a steel sheet in which the buckling generated in the rapid heating of the steel sheet can be prevented effectively regardless of the presence or absence of the roll constraining the steel sheet and to provide a heating apparatus used in this method.

Solution to Task

In order to solve the above task, the inventors have made various studies on a method for preventing the development of wrinkles resulted from thermal expansion in the width direction of the sheet through rapid heating to the buckling. As a result, it has been found out that it is effective to convert the plurality of small longitudinal wrinkles resulted from the rapid heating into a large wrinkle in order not to develop such a plurality of small longitudinal wrinkles to the buckling, that is, a widthwise central portion of the traveling steel sheet is antecedently heated to generate a wrinkle and thereafter the heating zone is enlarged in the width direction to widen the wrinkle up to a widthwise edge portion of the sheet. Thus the invention has been accomplished.

That is, the invention is a method for heating a steel sheet by heating a continuously traveled steel sheet, characterized by antecedently heating a widthwise central portion of the steel sheet.

Also, the heating method of the invention is characterized in that the steel sheet is heated so that an isotherm in the heating is a convex form toward an upstream side.

Further, the convex form in the heating method of the invention is characterized to be circular arc or V-shaped.

The invention is also an apparatus for heating a steel sheet characterized in that a heating means for a continuously traveling steel sheet is disposed so as to antecedently heat a widthwise central portion of the steel sheet.

The heating means for the steel sheet in the invention is characterized to be a solenoid type induction heating coil in which a form projected on the surface of the steel sheet is a convex form toward an upstream side.

Also, the convex form in the invention is characterized to be circular arc or V-shaped.

Further, the heating means for the steel sheet in the invention is characterized in that an antecedent heating means for heating a widthwise central portion of the steel sheet is disposed toward an upstream side of a solenoid type induction heating coil in which a form projected on the surface of the steel sheet is rectangular.

In addition, the antecedent heating apparatus in the invention is characterized to be a transverse type induction heating coil.

Moreover, the invention is characterized in that a pinch roll is disposed between the solenoid type induction heating coil and a downstream sheet traveling roll.

Effect of the Invention

According to the invention, the buckling generated in the rapid heating of the steel sheet can be prevented effectively, so that it is possible to stably travel the steel sheet into a continuous annealing installation and also it largely contributes to improve the quality in a product form of the steel sheet.

BRIEF DESCRIPTION OF THE DRAWINGS

FIG. 1 is a schematic view illustrating a heating apparatus using the conventional solenoid type induction heating coil and a plane shape of a steel sheet rapidly heated by this apparatus.

FIG. 2 is a schematic view illustrating a sectional form of the steel sheet taken along a line A-A' of FIG. 1.

FIG. 3 is a schematic view illustrating a heating apparatus of the invention using an arc-like solenoid type induction heating coil and a plane shape of a steel sheet rapidly heated by such an apparatus.

FIG. 4 is a schematic view illustrating a sectional form of the steel sheet taken along a line B-B' of FIG. 3.

FIGS. 5A, 5B and 5B are overhead views illustrating a change of a steel sheet shape depending upon a difference of a heating fashion.

FIG. 6 is a schematic view illustrating another heating apparatus of the invention using a V-shaped solenoid type induction heating coil.

FIG. 7 is a schematic view illustrating the other heating apparatus of the invention using an antecedent heating apparatus.

FIG. 8 is a schematic view illustrating another example of the heating apparatus of the invention in which a pinch roll is disposed at a downstream side of the heating apparatus shown in FIG. 3.

FIGS. 9A, 9B, and 9C are schematic views illustrating the other heating apparatus of the invention using a solenoid type induction heating apparatus.

FIGS. 10A and 10B are schematic views illustrating the other heating apparatus of the invention using a transverse type induction heating apparatus.

FIG. 11 is a view schematically showing an isotherm in the heating method of the invention.

EMBODIMENTS FOR CARRYING OUT THE INVENTION

In general, many transfer rolls are oppositely arranged in an annealing furnace in order to retain a steel sheet in the furnace for a long time in an installation for continuously annealing the steel sheet. The steel sheet is reciprocated between the opposite transfer rolls, while a crown of the transfer roll is made to a convex form to apply a given tension to the steel sheet in order to prevent meandering of the steel sheet traveled in the furnace to ensure stable traveling. As a result, since a force shrinking in the width direction of the sheet acts to the steel sheet traveled in the furnace, it is known that small longitudinal wrinkles are apt to be generated and in the worst case, they reach buckling referred to as a so-called "heat buckle" in being wound around the transfer roll.

However, the buckling targeted in the invention is considered to be a phenomenon different from the aforementioned buckling. Because, the buckling targeted in the invention results from the fact that thermal expansion is constrained in the rapid heating of the steel sheet. However, it is common in the sense that the plurality of small longitudinal wrinkles are crushed by contacting with the roll and the width of the wrinkle is made narrower to run into the buckling. Therefore, it is also considered for the buckling being caused by the aforementioned longitudinal wrinkles and the longitudinal wrinkles associated with the rapid heating superimposed.

The inventors have made studies on such a way that the plurality of small longitudinal wrinkles generated resulting from the rapid heating do not develop into the buckling. As a result, it has been found that the buckling can be prevented by making the plurality of small longitudinal wrinkles to a single wrinkle having a large width, and to this end, it is sufficient that a widthwise central portion of the traveling steel sheet is antecedently heated to generate a wrinkle in the widthwise central portion and thereafter the heating zone is enlarged to spread the wrinkle up to a widthwise edge portion of the sheet. Thus, the invention has been accomplished.

FIG. 1 is a schematic view illustrating a heating apparatus using the conventional solenoid type induction heating coil (induction heating coil arranged so as to pass the steel sheet through the induction coil wherein magnetic flux of an alternating current magnetic field is perpendicular to a vertical section of the traveling steel sheet, provided that the term "perpendicular" accepts a deviation of not more than 5° in thickness direction of the sheet and also accepts a deviation in the width direction of the sheet associated with the formation of convex shape) and a change of the shape of the steel sheet when the steel sheet is rapidly heated in this apparatus. Numeral 1 is a steel sheet, numeral 2, 2' transfer rolls, numeral 3 a solenoid type induction heating coil of which a form projected onto a surface of the steel sheet is rectangular, and numeral 4 a flowing direction of an induction alternating current applied to the coil. FIG. 2 is a schematic view illustrating a sectional form of the steel sheet taken along a line A-A' of FIG. 1. As shown in FIGS. 1 and 2, the steel sheet rapidly heated by the conventional rectangular heating coil tends to uniformly cause thermal expansion in the width direction of the sheet, but is restrained by the downstream transfer roll 2', whereby a plurality of long, small longitudinal wrinkles 5 are generated in the traveling direction of the steel sheet (two longitudinal wrinkles are shown in FIGS. 1 and 2).

On the contrary, FIG. 3 is a schematic view illustrating a heating apparatus of the invention and a change of the shape of the steel sheet when the steel sheet is rapidly heated in this apparatus. Numeral 1 is a steel sheet, numeral 2, 2' transfer rolls, numeral 6 a solenoid type induction heating coil in which a form projected onto a surface of the steel sheet is circular arc, and numeral 4 is a flowing direction of an induction alternating current applied to the coil. FIG. 4 is a schematic view illustrating a sectional form of the steel sheet taken along a line B-B' of FIG. 3. As shown in FIGS. 3 and 4, a widthwise central portion of the steel sheet is antecedently heated by a protruding portion of the arc-like heating coil in the heating apparatus of the invention. As a result, the rapidly heated steel sheet generates only one longitudinal wrinkle 5 having a large curvature of radius without generating the plurality of small longitudinal wrinkles as in the conventional heating apparatus even if thermal expansion is caused, so that such a wrinkle does not develop to buckling even in contact with the downstream transfer roll 2'.

The plurality of longitudinal wrinkles shown in FIGS. 1 and 2 and the single longitudinal wrinkle shown in FIGS. 3 and 4 are generated due to out-of-plane deformation of the steel sheet through thermal expansion, and a condition thereof is shown as an overhead view in FIG. 5. The steel sheet 101 is transferred in a direction from left side to right side and heated near the center of the drawing. In FIG. 5(a) of the conventional heating method, not only an isotherm 102 at an initial heating stage but also an isotherm 103 at an end of the heating are represented by approximately a straight line. In this case, the steel sheet causes out-of-plane deformation through thermal expansion (vertically deformed in this example) to bring about vertical displacement as shown by 104. In this conventional example are shown 5 points as a starting point 105 for the vertical out-of-plane deformation, but since the starting point for the out-of-plane deformation may be anywhere of the isotherm 102, the number of the starting points is indeterminate. However, once many wrinkles are generated, the number of wrinkles becomes stable as it is.

In the heating method of the invention, as shown in FIG. 5(b), the isotherm at the initial heating is curved because the widthwise central portion becomes antecedently high temperature, and the starting point for the out-of-plane deformation is only one at the center in the width direction of the sheet. Thus, a single wrinkle (longitudinal wrinkle in a broad sense) is generated, and all deformation through thermal expansion is absorbed by this wrinkle to finally form a longitudinal wrinkle having a large curvature of radius.

In the invention, it is desirable to conduct the heating so that all isotherms from start to end of the heating including the isotherm 102 at the initial heating and the isotherm 103 at the end of the heating coincides with each other when the isotherm is translated parallel to the traveling direction of the sheet. Because, when rough-to-dense of the isotherm are produced in the traveling direction of the sheet, the dense portion is heated in a short distance to produce a large thermal expansion, while the rough portion becomes small in the thermal expansion, so that wrinkles are intensively generated in the dense portion of the isotherm as shown in FIG. 5(c).

Concretely, according to the heating method of the invention, as schematically shown in FIG. 11, when an isotherm A at least lower by 200° C. than a heating end temperature or maximum temperature (lowest temperature when the maximum temperatures differ in the width direction of the sheet) and an isotherm B of the maximum temperature are convex form toward the upstream side and substantially symmetric with respect to the widthwise center and a height of the convex form (distance of isotherm between an end portion and a widthwise central top portion of the sheet in the traveling direction) is within ±30%, preferably within ±10%, with respect to one another, the buckling can be substantially avoided. Needless to say, the isotherms between the isotherms A and B are desirable to be convex form toward the upstream side and also the heights of their convex forms are desirable to be between the heights of A and B. The isotherm located at a lower temperature side than A is not particularly limited, but is preferable to be a convex form toward the upstream side immediately after the start of the heating, and also the height of its convex form is desirable to promptly reach between the heights of A and B. By heating so as to provide such a form of the isotherm is first heated the widthwise central portion of the sheet to start thermal expansion, so that a harmless wrinkle having a large curvature of radius is formed. Since then, too, the wrinkle grows from the center of the isotherm toward both widthwise edge portions thereof, so that a single wrinkle having a large curvature of radius is formed over a whole of the steel sheet. As a result, the heating can be conducted without forming a plurality of wrinkles, so that the occurrence of buckling can be prevented.

The reason why the heating apparatus of the invention is an induction heating coil and a solenoid type is shown as an example of the induction heating is due to the fact that the solenoid type is advantageous in view of the heating rate and also in a simple transverse type heating coil sandwiching the steel sheet between an upper coil and a lower coil, a magnetic field of an alternating current is perpendicular to the surface of the sheet and an induction current circularly flows in the surface of the sheet and hence the widthwise edge portion of the sheet is preferentially heated and the widthwise central portion cannot be antecedently heated simply. In the transverse type heating, it is also noted for the magnetic field of the alternating current to be perpendicular to the surface of the sheet. Hence, the transverse type induction heating is made even with only one side of the upper and lower coils.

FIG. 6 shows another embodiment of the heating apparatus of the invention and is an example that an induction heating coil 7 having a V-shaped form projected onto the surface of the steel sheet is used instead of the induction heating coil having a circular arc projected onto the surface of the steel sheet as shown in FIG. 3. Even in such a V-shaped induction heating coil, the widthwise central portion can be antecedently heated, so that the occurrence of buckling can be suppressed effectively. Moreover, although the form of the solenoid type induction heating coil viewing from one surface of the steel sheet is shown in FIGS. 3 and 6, the form of the opposite surface is made to be convex toward the upstream side similarly. Here, the induction heating coil is the convex form toward the upstream side in the front and rear surfaces of the steel sheet (conveniently expressed though there is essentially no distinction between front and rear surfaces). Although the front and rear coil forms are not necessary to be the same exactly, it is desirable that they are of the same shape and are symmetrical on front and rear surfaces with respect to the central plane of the steel sheet in thickness direction in order to stably keep constant interval between the isotherms.

FIG. 7 shows the other embodiment of the heating apparatus of the invention and is an example that another antecedent heating apparatus 8 heating the widthwise central portion of the steel sheet is disposed at the upstream side of the conventional rectangular solenoid type induction heating coil 3 shown in FIG. 1. By disposing such an antecedent heating apparatus 8 can be antecedently heated the widthwise central portion. As the antecedent heating apparatus, the heating means is not particularly limited, but a transverse type induction heating coil is preferable in view of the rapid heating.

In order to form the single large wrinkle in the heating apparatus of the invention, the heating is preferable to be conducted so that the interval between the isotherms of the heated steel sheet is made as equal as possible. From that standpoint, it is preferable to use an induction heating coil of an arc shown in FIG. 3 or a V-shaped shown in FIG. 6.

As previously mentioned, the heating method and apparatus of the invention are characterized in that the single large wrinkle is generated and developed by antecedently heating the widthwise central portion while suppressing the occurrence of a plurality of small longitudinal wrinkles. If such a wrinkle becomes too large, it becomes a so-called "C-warpage" and there is a fear of contacting with the other mechanical installation other than the transfer roll. In order to prevent such an inconvenience, it is preferable to dispose a pinch roll at the downstream side of the induction heating coil and at the upstream side of the downstream transfer roll. The pinch roll is preferable to be made of a material having a good thermal conductivity such as copper from a viewpoint of making the temperature in the width direction uniform.

FIG. 8 shows an example of disposing a pinch roll 9 at the downstream side of the induction heating coil in the heating apparatus of the invention shown in FIG. 3 and at the upstream side of the lower transfer roll. The pinch roll does not require the complicated incidental equipment such as buckling-preventive roll disclosed in Patent Document 3, so that there are advantages that the installation space is small and problems in the installation cost and maintenance are less.

Moreover, the heating apparatus of the invention can be applied to annealing installations of both vertical type and horizontal type. The heating apparatus of the invention may be disposed in a place requiring the rapid heating, and may also be disposed in the furnace for heat insulation, temperature keeping or atmosphere control. Further, the heating apparatus of the invention may be disposed alone or in two or more in series, or may be disposed by being divided into plural parts.

FIG. 9 shows the other embodiment of the heating apparatus of the invention having an induction heating coil made of a conductive plate. Since the essential feature of the invention is to antecedently heat the widthwise central portion so as to become high temperature in the heating of the steel sheet, when a solenoid type induction heating coil 202 made of a metal plate such as conductive copper or the like as shown by an overhead view in FIG. 9(*a*) is provided with a protruding portion 205 or a notched portion 206 as shown in FIG. 9(*b*), coil current 203 flows smoothly, so that the widthwise central portion can be heated antecedently. If this theory is applied, the invention can be conducted, for example, by adding conductors 204, 205 as shown in FIG. 9(*c*) even when using the conventional rectangular solenoid type induction heating apparatus.

Although the embodiment of rapidly heating with the solenoid type induction heating coil as a heating means has mainly been described in the explanation of the heating method and apparatus of the invention, even with the transverse type induction heating apparatus, the invention can be carried out. For example, there can be used a heating apparatus provided with a transverse type induction heating coil 302 having an arc-like current passage in the width direction as shown in FIG. 10(*a*), and a heating apparatus capable of antecedently heating the widthwise central portion even in the conventional rectangular transverse type coil 305 by changing the arrangement of a core material (iron core) 304 as shown in FIG. 10(*b*). Moreover, numeral 303 in FIGS. 10(*a*) and (*b*) indicates a coil current flowing in the induction heating coil 302. Although each coil current in FIGS. 9(*a*)-10(*b*) is an alternating current, it is shown by an unidirectional arrow for convenience sake.

In the heating apparatus of the invention, any heating means may be used as long as the widthwise central portion of the steel sheet can be antecedently subjected to rapid heating. For example, any heating means such as burner heating, plasma heating, laser heating, infrared ray heating and so on may be used. In order to obtain such a temperature distribution that the isotherm is rendered into the convex form toward the upstream side as previously mentioned by the heating means such as induction heating coil or the like, it is necessary that such a heating means conducts a proper control of power output depending upon a required heating temperature or a change of steel grade, size, traveling speed or the like. However, the control of the isotherm can be independently conducted with the above heating means by using the aforementioned auxiliary heating means or core material, so that it is possible to more easily conduct the heating control. In the heating control may be naturally applied prediction from the past heating performance, prediction from numerical calculation or the like.

EXAMPLE

A heating apparatus provided with a solenoid type induction heating coil having an arc form projected onto a surface of a steel sheet and a solenoid opening section of 1500 mm width×140 mm height×6000 mm length is disposed in a continuous annealing installation, and a cold rolled steel sheet having a thickness of 0.3 mm and a width of 1300 mm and containing 3 mass % of Si is traveled at 100 m/min, during which primary recrystallization annealing is carried out by rapidly heating from room temperature to 700° C. at 100° C./sec or 200° C./sec to produce a grain-oriented electrical steel sheet. As the arc-like solenoid type induction heating coil are used two types wherein a protruding length of a central portion is 50 mm or 100 mm with respect to both widthwise edge portions. Also, a part of the steel sheets is heated by a heating apparatus provided with a pinch roll as shown in FIG. 8.

The rate of defects for a product generated by buckling through rapid heating is shown in Table 1 with reference to the rate for heating at 200° C./sec by a heating apparatus provided with the conventional rectangular solenoid type induction heating coil as a standard (1.0). As seen from the results, the defects resulted from the buckling can be largely reduced by using the heating apparatus of the invention.

TABLE 1

| No. | Form of solenoid coil (protruding length of widthwise central portion) | Heating rate (° C./sec) | Presence or absence of pinch roll | Rate of defects due to buckling (relative value) | Remarks |
|---|---|---|---|---|---|
| 1 | arc (50 mm) | 200 | absence | 0.07 | Invention Example |
| 2 | arc (100 mm) | 200 | absence | 0.04 | Invention Example |

TABLE 1-continued

| No. | Form of solenoid coil (protruding length of widthwise central portion) | Heating rate (° C./sec) | Presence or absence of pinch roll | Rate of defects due to buckling (relative value) | Remarks |
|---|---|---|---|---|---|
| 3 | arc (50 mm) | 200 | presence | 0.03 | Invention Example |
| 4 | rectangular (0 mm) | 200 | absence | 1.0 | Comparative Example (standard condition) |
| 5 | arc (50 mm) | 100 | absence | 0.02 | Invention Example |
| 6 | rectangular (0 mm) | 100 | absence | 0.70 | Comparative Example |

INDUSTRIAL APPLICABILITY

According to the invention, the buckling generated in the rapid heating of the steel sheet can be prevented effectively, so that the steel sheet can stably travel through the continuous annealing installation or the like, and that the invention largely contributes to improve the quality in the shape of the steel sheet product. Especially, the technology of the invention can rapidly heat the steel sheet at a rate of not less than 100° C./sec without the generation of buckling, so that it is possible to advantageously produce grain-oriented electrical steel sheets having excellent magnetic properties by applying the above technology to the heating for primary recrystallization annealing.

DESCRIPTION OF REFERENCE SYMBOLS

1: steel sheet
2, 2': transfer roll
3: conventional rectangular solenoid type induction heating coil
4: flowing direction of excitation current
5: longitudinal wrinkle (buckling)
6: arc-like solenoid type induction heating coil
7: V-shaped solenoid type induction heating coil
8: antecedent heating apparatus (transverse type induction heating coil)
9: pinch roll
101, 201, 301: steel sheet
102: isotherm at initial heating
103: isotherm at end of heating
104: out-of-plane deformation quantity (displacement in up-down direction of steel sheet)
105: start point of out-of-plane deformation
202: solenoid type induction heating coil of conductive plate
203, 303: coil current (alternating current, but is shown by unidirectional arrow)
204: conductive plate added by reconstruction
205: protruding portion
206: notched portion
302: transverse type induction heating coil
304: core material
305: conventional transverse type induction heating coil

The invention claimed is:

1. A method for heating a steel sheet, the method comprising:
heating a continuously traveling steel sheet;
generating wrinkle in a widthwise central portion of the steel sheet by pre-heating the steel sheet before heating the continuously traveling steel sheet; and
spreading the wrinkle up to a widthwise edge portion of the sheet by thereafter enlarging a heating zone.

2. A method for heating a steel sheet according to claim 1, wherein the steel sheet is pre-heated so that an isotherm in the heating is a convex form toward an upstream side.

3. A method for heating a steel sheet according to claim 2, wherein the convex form is circular arc or V-shaped.

* * * * *